US012738093B2

(12) United States Patent
Shen et al.

(10) Patent No.: US 12,738,093 B2
(45) Date of Patent: Sep. 15, 2026

(54) DEPTH ASSISTED IMAGES REFINEMENT

(71) Applicants: HEWLETT-PACKARD DEVELOPMENT COMPANY, L.P., Spring, TX (US); PURDUE RESEARCH FOUNDATION, West Lafayette, IN (US)

(72) Inventors: Yezhi Shen, West Lafayette, IN (US); Weichen Xu, West Lafayette, IN (US); Qian Lin, Palo Alto, CA (US); Jan P. Allebach, West Lafayette, IN (US); Fengqing Zhu, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 395 days.

(21) Appl. No.: 17/870,618

(22) Filed: Jul. 21, 2022

(65) Prior Publication Data

US 2024/0029472 A1 Jan. 25, 2024

(51) Int. Cl.
*G06V 40/16* (2022.01)
*G06T 7/194* (2017.01)
*G06T 7/50* (2017.01)

(52) U.S. Cl.
CPC ............ *G06V 40/172* (2022.01); *G06T 7/194* (2017.01); *G06T 7/50* (2017.01); *G06T 2207/20084* (2013.01)

(58) Field of Classification Search
CPC . G06T 2207/10028; G06T 2207/20084; G06T 2207/30201; G06T 7/11; G06T 7/194; G06T 7/50; G06V 10/82; G06V 40/161; G06V 40/172
See application file for complete search history.

(56) References Cited

U.S. PATENT DOCUMENTS

| | | | |
|---|---|---|---|
| 5,914,748 A | 6/1999 | Parulski et al. |
| 6,141,435 A | 10/2000 | Naoi et al. |
| 6,184,858 B1 | 2/2001 | Christian et al. |
| 6,430,303 B1 | 8/2002 | Naoi et al. |
| 6,546,115 B1 | 4/2003 | Ito et al. |

(Continued)

FOREIGN PATENT DOCUMENTS

CN 110232326 A * 9/2019 ........... G06F 18/214

OTHER PUBLICATIONS

A machine translated English version of document CN 110232326 (Year: 2019).*

(Continued)

*Primary Examiner* — Ruiping Li
(74) *Attorney, Agent, or Firm* — Quarles & Brady LLP

(57) ABSTRACT

In some examples in accordance with the present description, an electronic device is provided. The electronic device includes a controller to implement an image segmentation process. The controller is to obtain color information of an image. The controller also is to obtain depth information of the image. The controller also is to determine a depth of a face represented in the color information. The controller also is to segment a foreground of the image from a background of the image according to the color information and the depth information based on the depth of the face.

20 Claims, 7 Drawing Sheets

(56) References Cited

U.S. PATENT DOCUMENTS 7,783,075 B2 8/2010 Zhang et al.
8,073,247 B1 12/2011 Sandrew et al.
9,078,048 B1 7/2015 Gargi et al.
10,121,229 B2 11/2018 Gray et al.
10,311,579 B2 6/2019 Yun et al.
11,276,177 B1 3/2022 Tsai et al.
2003/0090751 A1 5/2003 Itokawa et al.
2004/0151342 A1 8/2004 Venetianer et al.
2006/0285747 A1 12/2006 Blake et al.
2007/0133880 A1 6/2007 Sun et al.
2007/0286520 A1 12/2007 Zhang et al.
2009/0087096 A1 4/2009 Eaton et al.
2011/0285748 A1 11/2011 Slatter et al.
2012/0050323 A1 3/2012 Baron et al.
2012/0140066 A1 6/2012 Lin
2012/0207345 A1 8/2012 Tang
2012/0327172 A1 12/2012 El-Saban et al.
2013/0101208 A1 4/2013 Feris et al.
2014/0003720 A1 1/2014 Seow et al.
2014/0132789 A1 5/2014 Koyama
2015/0003675 A1 1/2015 Nakagami
2015/0221066 A1 8/2015 Kobayashi
2015/0310297 A1 10/2015 Li et al.
2016/0125268 A1 5/2016 Ebiyama
2017/0046827 A1* 2/2017 Meyer .................... G06T 7/277
2017/0161905 A1 6/2017 Reyzin
2017/0263037 A1 9/2017 Maruyama et al.
2017/0330050 A1 11/2017 Baltsn
2017/0358094 A1 12/2017 Sun et al.
2018/0144476 A1 5/2018 Smith
2018/0255326 A1 9/2018 Oya
2018/0365809 A1 12/2018 Cutler et al.
2019/0052868 A1 2/2019 Na et al.
2019/0104253 A1 4/2019 Kawai
2019/0180107 A1 6/2019 Pham
2019/0347776 A1 11/2019 Chou et al.
2020/0273152 A1 8/2020 Lin
2020/0402243 A1 12/2020 Benou et al.
2021/0004943 A1 1/2021 Fukasawa et al.
2021/0166399 A1 6/2021 Stephens et al.
2021/0209734 A1* 7/2021 Simhadri ............. G06V 40/165
2021/0243383 A1 8/2021 Huang et al.
2022/0109838 A1 4/2022 Guruva et al.
2022/0215531 A1 7/2022 Azernikov et al.
2022/0256116 A1 8/2022 Chu et al.
2023/0014805 A1 1/2023 Verma et al.
2023/0026038 A1 1/2023 Iwakiri
2023/0044969 A1 2/2023 Yang et al.
2023/0063678 A1 3/2023 Janus et al.
2023/0224582 A1 7/2023 Awasthi et al.
2024/0031517 A1 1/2024 Liu et al.
2024/0054608 A1 2/2024 Shen et al.
2024/0104742 A1 3/2024 Xu et al.
2024/0153038 A1 5/2024 Duan et al.
2024/0404017 A1 12/2024 Xiang et al.

OTHER PUBLICATIONS

Jiang et al, "Robust RGB-D Face Recognition Using Attribute-Aware Loss", 2020 (Year: 2020).*

Goswami et al, "RGB-D Face Recognition With Texture and Attribute Features", 2014 (Year: 2014).*

Howard, Andrew et al, "Searching for MobileNetV3", arXiv:1905.02244v5, Nov. 20, 2019, 11 pages.

Mingyang et al, "An End-to-End Atrous Spatial Pyramid Pooling and Skip-Connections Generative Adversarial Segmentation Network for Building Extraction from High-Resolution Aerial Images", vol. 12, 5151, Applied Sciences , May 20, 2022, pp. 1-21.

* cited by examiner

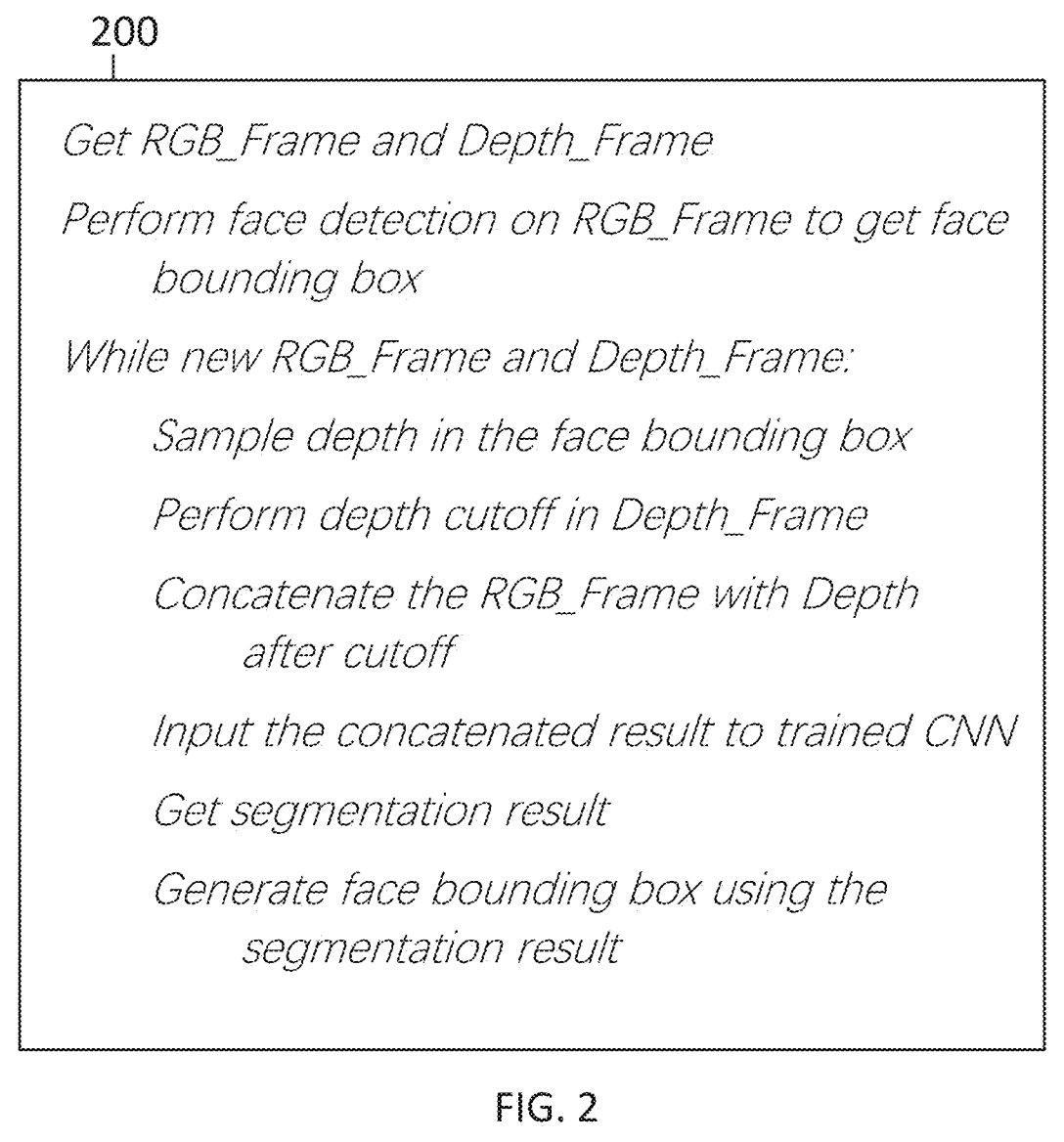

200

Get RGB_Frame and Depth_Frame

Perform face detection on RGB_Frame to get face bounding box

While new RGB_Frame and Depth_Frame:

Sample depth in the face bounding box

Perform depth cutoff in Depth_Frame

Concatenate the RGB_Frame with Depth after cutoff

Input the concatenated result to trained CNN

Get segmentation result

Generate face bounding box using the segmentation result

FIG. 2

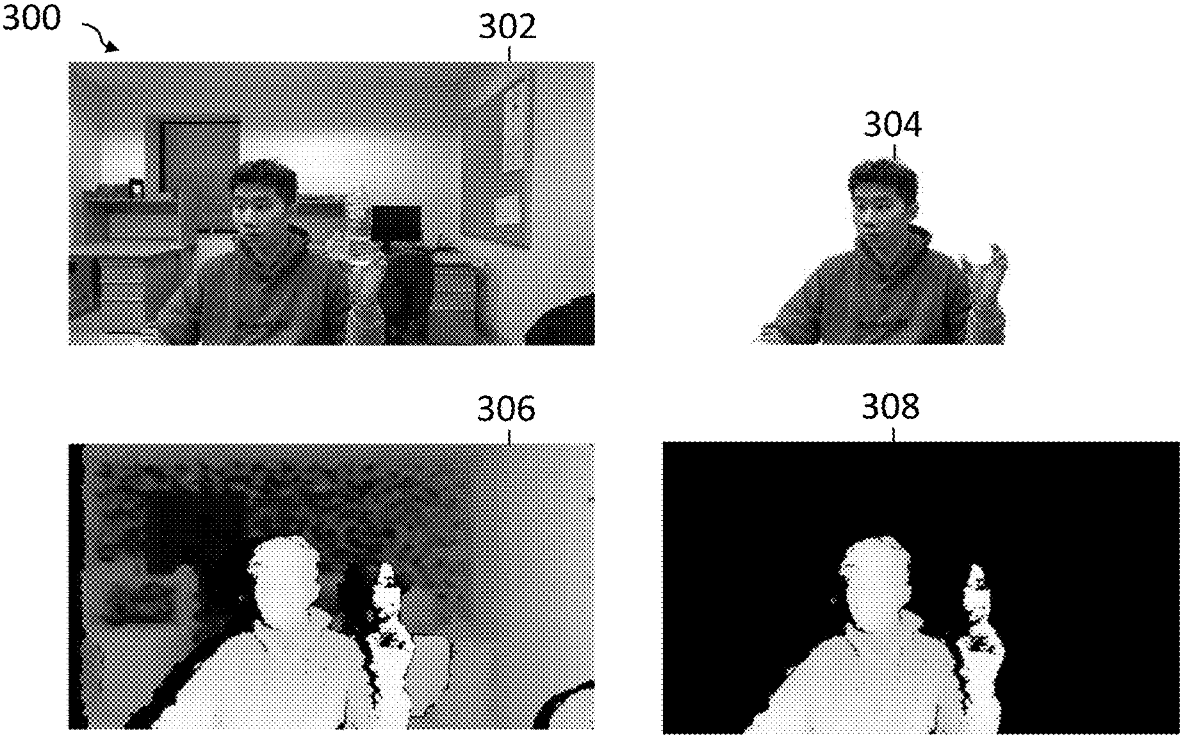
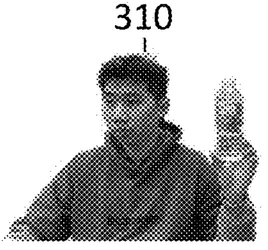
FIG. 3

DEPTH ASSISTED IMAGES REFINEMENT

BACKGROUND

Electronic devices such as desktops, laptops, notebooks, tablets, and smartphones include executable code that enables users to perform video conferencing. During video conferencing sessions, video may be captured by a user's device and transmitted to a viewer's device in substantially real time (e.g., accounting for transmission lag but not having a delay to allow any meaningful amount of processing to be performed). Some video conferencing experiences enable the virtual modification of a user's background, either via blurring of the user's background or replacement of the user's background.

BRIEF DESCRIPTION OF THE DRAWINGS

Various examples will be described below referring to the following figures:

FIG. 2 is a diagram of pseudocode in accordance with various examples.

FIG. 3 is a pictographical representation of an object segmentation process in accordance with various examples.

DETAILED DESCRIPTION

Figure 1:
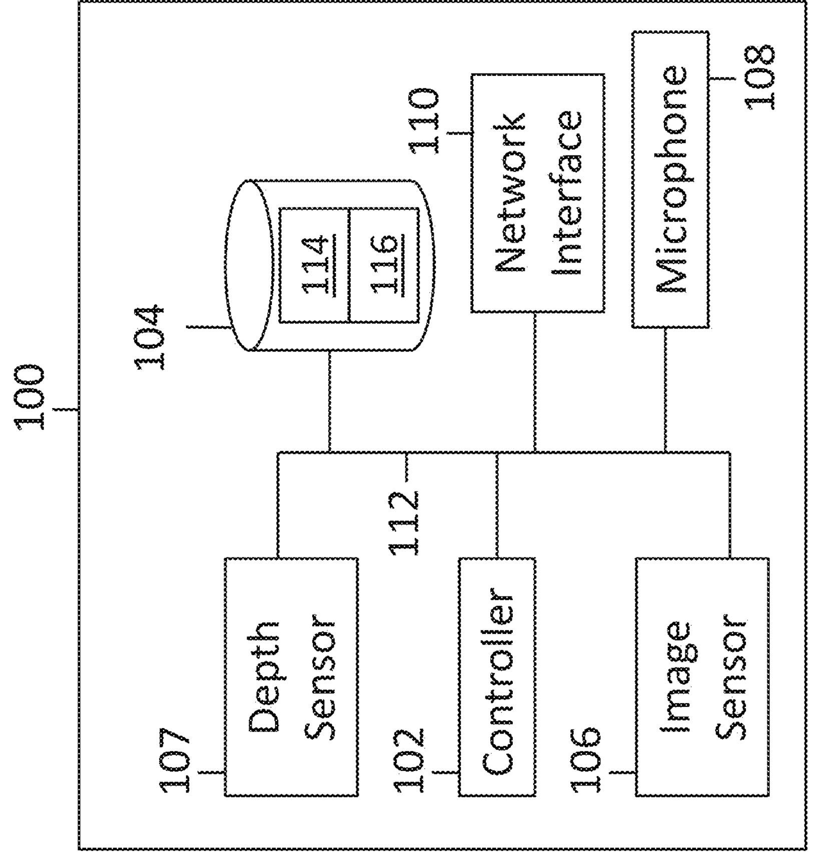
FIG. 1 is a block diagram of an electronic device in accordance with various examples.

As described above, electronic devices such as desktops, laptops, notebooks, tablets, and smartphones include executable code that enables users to perform video conferencing. During video conferencing sessions, video may be captured by a user's device and transmitted to a viewer's device in substantially real time (e.g., accounting for transmission lag but not having a delay to allow any meaningful amount of processing to be performed). Some video conferencing experiences enable the virtual modification of a user's background, either via blurring of the user's background or replacement of the user's background.

Background blur and background replacement each include separation or segmentation of a foreground (e.g., the user) from a background of the video. Such separation may be performed according to an object segmentation process. However, challenges may arise in performing object segmentation for transparent or semi-transparent foreground elements, as well as for small portions of background encircled by the foreground.

To increase a capability for performing object segmentation for transparent or semi-transparent foreground elements and small portions of background encircled by the foreground, segmentation may be performed according to a combination of red-green-blue (RGB) image data and a corresponding depth map, such as may be captured by a depth-capable camera or other sensor(s) capable of determining and providing depth information. In some examples, the depth-capable camera is implemented as a stereo infrared sensor.

An segmentation according to RGB data may be performed, resulting in isolation of the foreground from the background. However, the foreground may be inaccurate, either including elements as foreground that are in fact background and/or omitting elements as background that are in fact foreground.

To mitigate these inaccuracies, facial detection may be performed on the RGB image data to identify a face. A bounding box may be identified around the face and depth sampling of the depth map may be performed at a point or points within the bounding box. A depth cutoff of the depth image may be performed for points having greater than a threshold distance from the sampled point(s) in the depth map. The cutoff depth image and the RGB image data may be concatenated and provided to a convolutional neural network (CNN) for processing. Based on that processing, the CNN provides a segmentation result. In at least some examples, a combined RGB image and depth image approach to image segmentation improves a user experience of a user implementing the image segmentation by, for example, more accurately segmenting a foreground from a background of an image.

In some examples in accordance with the present description, an electronic device is provided. The electronic device includes an image sensor, a depth sensor, and a controller. The controller is to receive, from the image sensor, RGB information of an image. The controller also is to receive, from the depth sensor, depth information of the image. The controller also is to perform facial detection to identify a face in the RGB information. The controller also is to truncate the depth information to exclude information for depth points not within a threshold variance from a depth of the identified face. The controller also is to process the image and the truncated depth information according to a machine learning process to segment a foreground of the image from a background of the image.

In some examples in accordance with the present description, an electronic device is provided. The electronic device includes a controller to implement an image segmentation process. The controller is to obtain color information of an image. The controller also is to obtain depth information of the image. The controller also is to determine a depth of a face represented in the color information. The controller also is to segment a foreground of the image from a background of the image according to the color information and the depth information based on the depth of the face.

In some examples in accordance with the present description, a non-transitory computer-readable medium storing machine-readable instructions is provided. The instructions, when executed by a controller of an electronic device, cause the controller to obtain color information of an image, obtain depth information of the image, determine a depth of a face present in the image, perform a depth cutoff of the depth information for points having greater than a threshold variance from the depth of the face, and process the image according to the cutoff depth information and the color information to obtain a foreground of the image.

FIG. 1 is a block diagram of an electronic device 100 in accordance with various examples. The electronic device 100 may be a laptop computer, a desktop computer, a notebook, a tablet, a server, a smartphone, or any other suitable electronic device having a camera and capable of participating in video conferencing sessions. The electronic device 100 may include a controller 102 (e.g., a central processing unit (CPU), a microprocessor, etc.), a storage 104 (e.g., random access memory (RAM), read-only memory (ROM)), an image sensor 106 to capture images and video in an environment of the electronic device 100, a depth sensor 107 to capture depth information, a microphone 108 to capture audio in an environment of the electronic device 100, and a network interface 110. The network interface 110 enables the controller 102, the image sensor 106, the depth sensor 107, and/or the microphone 108 to communicate with other electronic devices external to the electronic device 100. For example, the network interface 110 enables the controller 102 to transmit signals to and receive signals from another electronic device over the Internet, a local network, etc., such as during a video conferencing session. A network 112 may couple the controller 102, storage 104, image sensor 106, depth sensor 107, microphone 108, and network interface 110 to each other. Storage 104 may store executable code 114 (e.g., an operating system (OS)) and executable code 116 (e.g., an application, such as a video conferencing application that facilitates video conferencing sessions with electronic devices via the network interface 110). In examples, the image sensor 106 may capture and store images and/or video (which is a consecutive series of images, or image frames) to the storage 104. In examples, the microphone 108 may capture and store audio to the storage 104. In examples, the storage 104 includes a buffer or buffers (not shown) to temporarily store image and/or video captured by the image sensor 106, the depth sensor 107, and/or audio captured by the microphone 108 prior to transmission via the network interface 110 or manipulation by the controller 102.

In operation, the controller 102 executes the executable code 116 to participate in a video conferencing session. As the controller 102 executes the executable code 116, the controller 102 receives images and/or video captured by the image sensor 106, depth information captured by the depth sensor 107, and/or audio captured by the microphone 108 and provides the image, video, depth information, and/or audio data to the network interface 110 for transmission to another electronic device that is participating in the video conferencing session with the electronic device 100.

As described above, a user of the electronic device 100 may be participating in the video conferencing session and may wish to alter a background of the video conferencing session. To perform such alteration, object segmentation is performed to separate a foreground subject of the video conferencing session from the background of the video conferencing session. However, challenges can arise in separating transparent or semi-transparent foreground elements and small portions of background encircled by foreground elements. To mitigate these challenges, information from the image sensor 106 and the depth sensor 107 is combined to perform the object segmentation. For example, the image sensor 106 provides RGB information and the depth sensor 107 provides depth information, such as a depth map. The RGB information includes the color representation of the foreground and background. The depth information includes information relating to the distance of the surfaces represented in the RGB information from a viewpoint, such as the depth sensor 107, which may be positioned adjacent to the image sensor 106 and directed in a same direction as the image sensor 106. In some examples, the image sensor 106 and the depth sensor 107 may be components of a same module or device. In some examples, the depth sensor 107 includes multiple imagers, such as a left imager and a right imager disposed on respective opposing sides of an RGB camera (e.g., the image sensor 106). The depth map is determined according to the below equation 1, for example.

$$D_{i,j}=d\times f\div dv_{i,j} \tag{1}$$

In the above equation 1, $D_{i,j}$ is a depth value at pixel (i, j) of the depth map, d is a distance between the imagers of the depth sensor 107, f is an average focal length of the left and right imagers of the depth sensor 107, and $dv_{i,j}$ is a disparity value for the pixel at (i, j). Each pixel in the depth map is projected from (i, j) in a 2-dimensional pixel plane (e.g., as captured by the depth sensor 107) to three dimensional (x, y, z) space based on the following equations 2 through 4.

$$\frac{x}{z}=(C_x-i)/f_x \tag{2}$$

$$\frac{y}{z}=(C_y-j)/f_y \tag{3}$$

$$z=D/\sqrt{1+\frac{x^2}{z}+\frac{y^2}{z}} \tag{4}$$

In the above equations 2 through 4, $C_x$ and $C_y$ are center pixel positions on the horizontal and vertical axis of the depth map, respectively, and $f_x$ and $f_y$ are focal lengths of the imagers of the depth sensor 107 on the horizontal and vertical axes, respectively.

To combine the RGB information and the depth information, the controller 102 performs facial detection on the RGB information to identify a face of the user. Based on the identified face, the controller 102 forms or otherwise defines a bounding box that encompasses the identified face in two dimensions. In examples of the RGB information in which multiple faces are identified, a bounding box may be formed around each identified face and the following operations are performed for each identified face/bounding box. The controller 102 samples the depth map within the bounding box to determine an approximate distance of the user from the viewpoint. In various examples, any number of locations greater than or equal to one within the bounding box may be sampled. In some examples, multiple samples may be averaged to determine an average depth of the user from the viewpoint. In other example, a deepest sampled depth may be determined as the depth of the user.

After determining a depth of the user from the viewpoint, the controller 102 performs a depth cutoff. The depth cutoff removing points of the depth map that have a depth greater than the depth of the user, or greater than the depth of the user plus a threshold amount (e.g., truncates the depth map). In some examples, the controller 102 performs the depth cutoff based on clustering. For example, the controller 102 performs Euclidean distance clustering to perform the depth cutoff. The Euclidean distance clustering implements region growing in 3D space (e.g., the (x, y, z) space), identifying points in the depth map that are connected to the sampled point (e.g., the point in the (i, j) space representing the depth of the user) and removing points in the depth map that are unconnected to the sampled point. A result of the depth cutoff may be considered a depth map segmentation result, such that the depth map approximates a segmentation of the foreground of the depth map from the background of the depth map.

An output of the image sensor 106 (e.g., RGB information in separate R, G, and B channels) and the depth map segmentation result are concatenated to form a 4-channel input. The controller 102 may apply a suitable machine learning technique, such as a CNN, to the 4-channel input to determine a segmentation result. In various other examples, other machine learning, artificial intelligence, or machine vision processing techniques or process(es) are applied to the 4-channel input to determine the segmentation result. In examples, the segmentation result is represented as an image mask, such as having black pixels in a region determined to be the background and white pixels in a region determined to be the foreground. The controller 102 may subsequently apply the mask to the RGB information to perform object segmentation, obtaining a separate representation of the foreground that does not include the background. The controller 102 may manipulate (blur, replace, recolor, augment, etc.) the RGB information and overlay the masked foreground on the manipulated representation of the RGB information to provide final video data for use in the video conferencing session, such as for transmission by the network interface 110.

FIG. 2 is a diagram of pseudocode 200 in accordance with various examples. The pseudocode 200 may be representative of operations to be performed by the controller 102 to perform object segmentation, as described herein. For example, the pseudocode 200 may be a plain-language description of operations that may be performed by the controller 102 based on machine-executable instructions (e.g., the executable code 116) stored to the storage 104 and executed by the controller 102 in response to receipt of a request from the user to manipulate a background of an image or video for a video conferencing session.

The pseudocode 200 begins with the controller 102 obtaining an RGB data frame (RGB_Frame) and a depth data frame (Depth_Frame). In some examples, the controller 102 obtains the data from cameras, such as the image sensor 106 and/or depth sensor 107. In other examples, the controller 102 obtains the data from the storage 104, such as a buffer or other location to which the image sensor 106 and/or depth sensor 107 temporarily stored the data. The controller 102 performs facial detection according to any suitable process to identify a face in the RGB_Frame and defines a bounding box surrounding the face. For each newly received RGB_Frame and Depth_Frame (e.g., such as multiple sequentially captured and obtained frames that together form video) the controller 102 executes an operational loop. The loop includes sampling a depth in the bounding box, performing a depth cutoff of the Depth_Frame based on the sampled depth, concatenating the RGB_Frame with the cutoff Depth_Frame, providing the concatenation result to a trained CNN (or other machine learning process), obtaining a segmentation result, and generating a new face bounding box based on the segmentation result, such as via facial detection, as described above. The controller 102 performs the above actions according to processes or operations substantially as described above with respect to FIG. 1.

FIG. 3 is a pictographical representation 300 of an object segmentation process in accordance with various examples. The representation 300 includes images 302, 304, 306, and 308. The image 302 represents the RGB information obtained from the image sensor 106 (or the RGB_Frame of the pseudocode 200). Image 304 represents a result of object segmentation performed on the image 302 without the teachings of this disclosure, such as without including the use of depth map information. The image 306 represents the depth information obtained from the depth sensor 107 (or the Depth_Frame of the pseudocode 200). The image 308 represents the depth information of the image 306 after undergoing truncation or depth cutoff, as described here. The image 310 represents the image 302, masked according to the mask determined by the controller 102 based on processing of both the RGB data of the image 302 and the depth information of the image 308. As shown by a comparison of the image 304 (determined without use of the teachings of this disclosure) to the image 310 (determined according to the depth assisted images refinement teachings of this disclosure), the image 310 is a more accurate representation of the foreground of the image 302, thereby resulting in an improved user experience when performing object segmentation for a video conferencing session.

Figure 4:
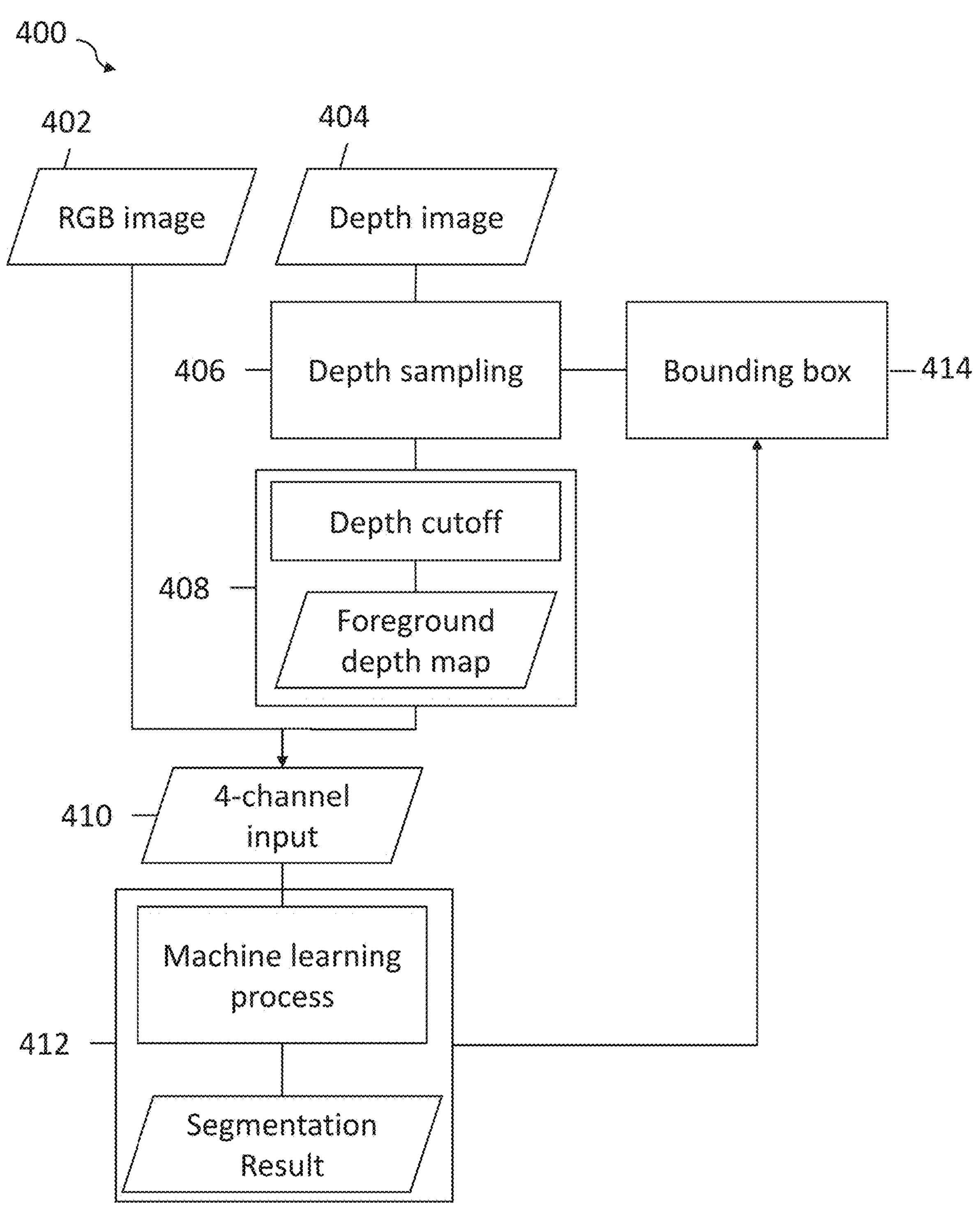
FIG. 4 is a flow diagram of a method in accordance with various examples.

FIG. 4 is a flow diagram of a method 400 in accordance with various examples. In some examples, the method 400 is implemented by the controller 102, such as to perform object segmentation as described herein according to a depth assisted image refinement process. The controller 102 may perform or execute the method 400 as a result of executing the executable code 116, for example. The method 400 includes obtaining RGB data (402) and obtaining Depth data (404). In a first iteration of the method 400 (e.g., for first received RGB data and first received Depth data), there may be no bounding box yet defined. As such, the foreground depth map may be the Depth information directly such that a segmentation result is substantially similar to that shown in image 304. In a second iteration of the method 400, the method 400 includes sampling the Depth data according to a determined bounding box (406). The method 400 includes performing a depth cutoff of the sampled Depth data to form a foreground depth map (408). The method 400 includes concatenating the RGB data with the foreground depth map to form a 4-channel input (410). The method includes processing the 4-channel input according to a machine learning technique, such as a CNN, to determine a segmentation result (412). The method 400 includes processing the segmentation result to identify a bounding box (414). The bounding box may be useful for performing depth sampling at operation 406 for subsequently received RGB and Depth data.

Although not shown in FIG. 4, in examples the method 400 also includes manipulating the image, or the background of the image based on an inversion of the segmentation result, masking the image according to the segmentation result to segment the foreground from the background, and overlaying the masked foreground on top of the manipulated background. The resulting combined image, in some examples, is transmitted, such as in a video conferencing session.

The method 400 is implemented by machine-readable instructions (e.g., the executable code 116) stored to a storage device (e.g., the storage 104) of an electronic device (e.g., the electronic device 100), in various examples. A processor (e.g., the controller 102) of the electronic device executes the machine-readable instructions to perform the method 400, for example. Unless infeasible, some or all of the method 400 may be performed concurrently or in different sequences. For example, the processor performs a block that occurs responsive to a command sequential to the block describing the command. In another example, the processor performs a block that depends upon a state of a component after the state of the component is enabled or disabled.

Figure 5:
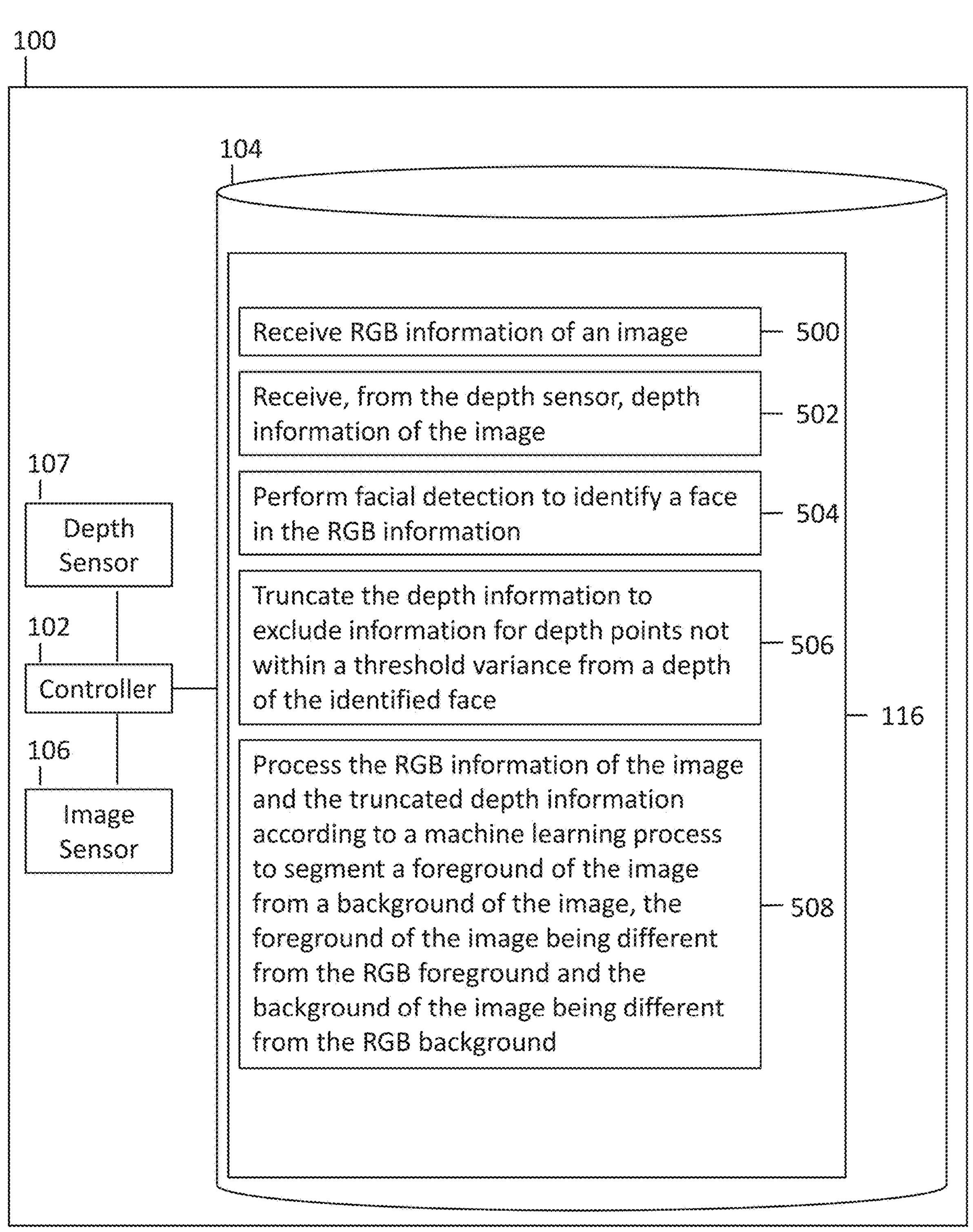
FIGS. 5 and 6 are block diagrams of an electronic device in accordance with various examples.
Figure 6:
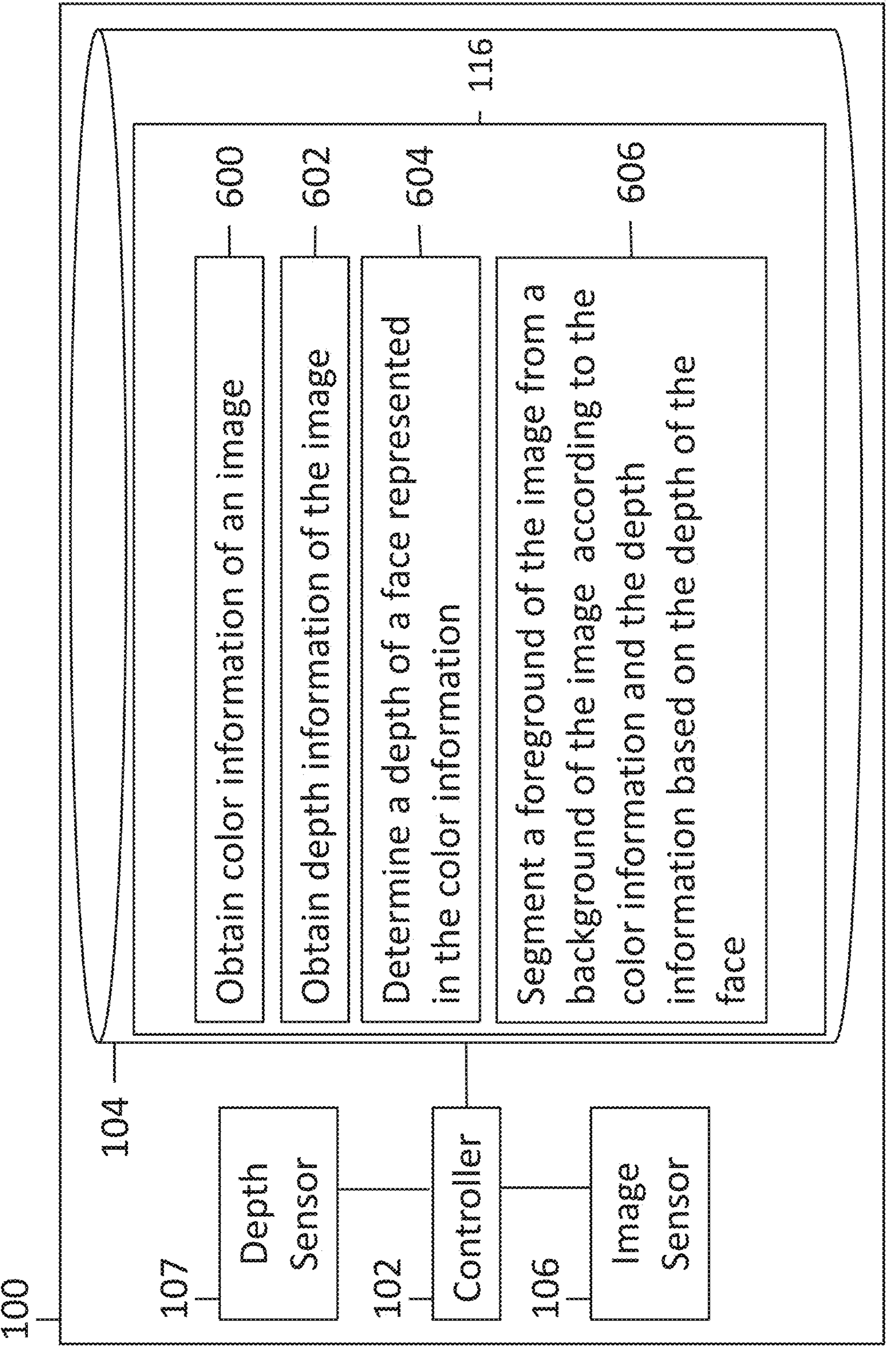

FIGS. 5 and 6 are block diagrams of the electronic device 100, including the controller 102 coupled to the storage 104, in accordance with various examples. Specifically, FIG. 5 shows an example of the electronic device 100, including the controller coupled to the storage 104 along with image sensor 106 and depth sensor 107 coupled to the controller 102. The storage 104 stores executable instructions that may be executed by the controller 102. The storage 104 includes executable instruction 500, which causes the controller 102 to receive, from the image sensor, RGB information of an image. The storage 104 includes executable instruction 502, which causes the controller 102 to receive, from the depth sensor, depth information of the image. The storage 104 includes executable instruction 504, which causes the controller 102 to perform facial detection to identify a face in the RGB information. The storage 104 includes executable instruction 506, which causes the controller 102 to truncate the depth information to exclude information for depth points not within a threshold variance from a depth of the identified face. The storage 104 includes executable instruction 508, which causes the controller 102 to process the RGB information of the image and the truncated depth information according to a machine learning process to segment a foreground of the image from a background of the image. Actions performed by the controller 102 pursuant to executing the executable instructions may be carried out in a manner substantially similar to that described above with respect to FIG. 1, or any other figures of this disclosure.

FIG. 6 shows an example of the electronic device 100, including the controller 102 coupled to the storage 104 along with image sensor 106 and depth sensor 107 coupled to the controller 102. The storage 104 stores executable instructions that may be executed by the controller 102. The storage 104 includes executable instruction 600, which causes the controller 102 to obtain color information of an image. The storage 104 includes executable instruction 602, which causes the controller 102 to obtain depth information of the image. The storage 104 includes executable instruction 604, which causes the controller 102 to determine a depth of a face represented in the color information. The storage 104 includes executable instruction 606, which causes the controller 102 to segment a foreground of the image from a background of the image according to the color information and the depth information based on the depth of the face. Actions performed by the controller 102 pursuant to executing the executable instructions may be carried out in a manner substantially similar to that described above with respect to FIG. 1, or any other figures of this disclosure.

Figure 7:
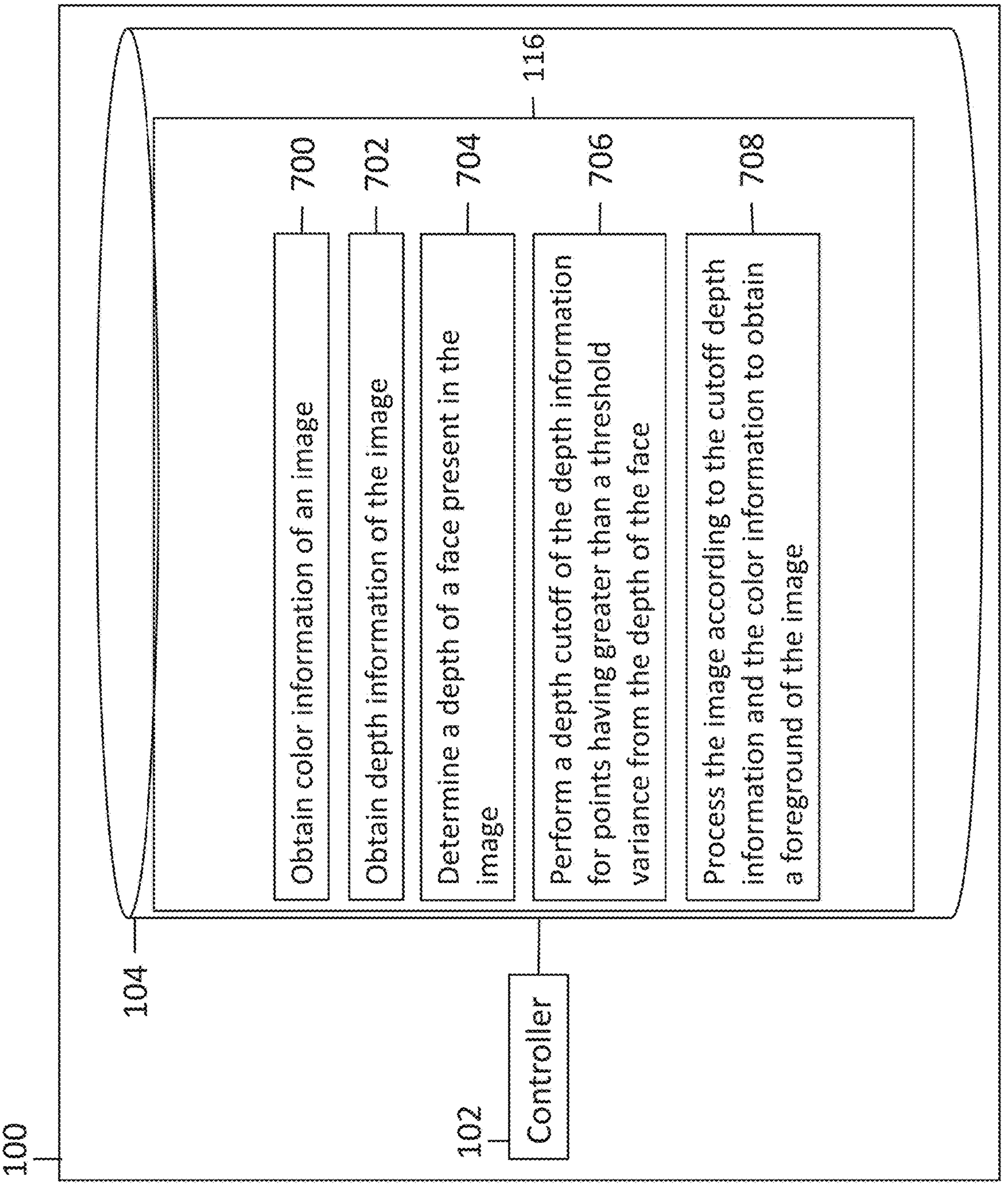
FIG. 7 is a block diagram of non-transitory, computer-readable media in accordance with various examples.

FIG. 7 is a block diagram of non-transitory, computer-readable media in accordance with various examples. Specifically, FIG. 7 depicts an example of the electronic device 100, including the controller 102 coupled to the storage 104. The storage 104 includes executable instruction 700, which causes the controller 102 to obtain color information of an image. The storage 104 includes executable instruction 702, which causes the controller 102 to obtain depth information of the image. The storage 104 includes executable instruction 704, which causes the controller 102 to determine a depth of a face present in the image. The storage 104 includes executable instruction 706, which causes the controller 102 to perform a depth cutoff of the depth information for points having greater than a threshold variance from the depth of the face. The storage 104 includes executable instruction 708, which causes the controller 102 to process the image according to the cutoff depth information and the color information to obtain a foreground of the image. Actions performed by the controller 102 pursuant to executing the executable instructions may be carried out in a manner substantially similar to that described above with respect to FIG. 1, or any other figures of this disclosure.

As described herein, executable code includes an "application," "software," and "firmware." The terms "application," "software," and "firmware" are considered to be interchangeable in the context of the examples provided. "Firmware" is considered to be machine-readable instructions that a processor of the electronic device executes prior to execution of the operating system (OS) of the electronic device, with a small portion that continues after the OS bootloader executes (e.g., a callback procedure). "Application" and "software" are considered broader terms than "firmware," and refer to machine-readable instructions that execute after the OS bootloader starts, through OS runtime, and until the electronic device shuts down.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component is omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
- an image sensor;
- a depth sensor; and
- a controller to:
  - receive, from the image sensor, red-green-blue (RGB) information of an image in separate R, G, and B channels;
  - receive, from the depth sensor, depth information of the image;
  - perform facial detection to identify a face in the RGB information;
  - truncate the depth information to exclude information for depth points not within a threshold distance from a depth of the identified face;
  - process the R, G, and B channels of the image and the truncated depth information according to a trained machine learning process to separate a foreground of the image from a background of the image, the trained machine learning process to receive the R, G, and B channels of the image and the truncated depth information as input and to output a segmentation result;
  - form an image mask by processing the RGB information and the truncated depth information according to the machine learning process;
  - apply the image mask to the image to obtain a separate representation of a foreground;
  - manipulate a background of the image by at least one of blurring or replacing the background;
  - overlay the separate foreground representation on the manipulated background to provide video data; and
  - transmit, via a network interface, the video data to another electronic device participating in a video conferencing session.

2. The electronic device of claim 1, wherein the controller is to truncate the depth information according to Euclidean distance clustering.

3. The electronic device of claim 1, wherein the controller is to sample the depth information within a bounding box that bounds the identified face to determine the depth of the identified face.

4. The electronic device of claim 1, wherein the controller is to process the R, G, and B channels of the image and the truncated depth information according to a convolutional neural network.

5. An electronic device, comprising:

a controller to implement an image segmentation process to:

obtain color information of an image in separate color channels;

obtain depth information of the image;

determine a depth of a face represented in the color information;

provide the color information of the image in the separate color channels and the depth of the face to a trained machine learning process to separate a foreground of the image from a background of the image, the trained machine learning process to receive the color channels of the image and the truncated depth information as input and to output a segmentation result, perform a depth cutoff of points of the depth information and separate the foreground of the image from the background of the image by processing the image and the cutoff depth information according to the trained machine learning process to form an image mask;

concatenate the separate color channels with the truncated depth information to form a four-channel input to the trained machine learning process;

process the four-channel input to generate the segmentation result; and generate an updated face bounding box based on the segmentation result, the updated face bounding box for use in performing depth sampling for a subsequently received image.

6. The electronic device of claim 5, wherein the controller is to perform facial detection on the color channels of the image to define a region of the image including the face and sample the depth information of the image within the region to determine the depth of the face.

7. The electronic device of claim 6, wherein the controller is to perform a depth cutoff of points of the depth information that have a greater distance from a viewpoint than the depth of the face plus a threshold value.

8. The electronic device of claim 5, wherein the controller is to apply the image mask to the image to separate the foreground of the image from the background of the image.

9. A non-transitory computer-readable medium storing machine-readable instructions which, when executed by a controller of an electronic device, cause the controller to:

obtain color information of an image in separate red, green, and blue color channels;

obtain depth information of the image;

determine a depth of a face present in the image;

perform a depth cutoff of the depth information for points having greater than a threshold distance from the depth of the face;

provide a 4-channel input to a machine learning process to process the image according to the cutoff depth information and the color information to separate a foreground of the image from a background of the image, the 4-channel input including the cutoff depth information, the red color channel, the green color channel, and the blue color channel, the trained machine learning process to receive the 4-channel input and to output a segmentation result, form an image mask by processing the 4-channel input according to the machine learning process;

apply the image mask to the image to obtain a separate representation of a foreground;

manipulate a background of the image by at least one of blurring or replacing the background; and overlay the separate foreground representation on the manipulated background to provide video data for a video conferencing session.

10. The computer-readable medium of claim 9, wherein execution of the executable code causes the controller to determine a bounding box surrounding the face in the color information of the image and determine the depth of the face by sampling the depth information at points with a region bounded by the bounding box.

11. The computer-readable medium of claim 9, wherein execution of the executable code causes the controller to perform the depth cutoff according to Euclidean distance clustering.

12. The computer-readable medium of claim 9, wherein execution of the executable code causes the controller to overlay the foreground over a manipulated representation of the image.

13. The computer-readable medium of claim 12, wherein the manipulated representation is a blurring of the image or a replacement of the image.

14. The electronic device of claim 1, wherein the controller is to concatenate the RGB information with the truncated depth information to generate a 4-channel input for the trained machine learning process.

15. The electronic device of claim 1, wherein the controller is to manipulate the RGB information to overlay the RGB information of the foreground of the image on a manipulated representation of the RGB information of the background of the image.

16. The electronic device of claim 5, wherein the controller is to manipulate the color information to overlay the color information of the foreground of the image on a manipulated representation of the color information of the background of the image.

17. The computer-readable medium of claim 9, wherein execution of the executable code causes the controller to concatenate the red, green, and blue color channels with the truncated depth information to generate the 4-channel input for the trained machine learning process.

18. The computer-readable medium of claim 9, wherein execution of the executable code causes the controller to manipulate the red, green, and blue color channels to overlay the color information of the foreground of the image on a manipulated representation of the color information of the background of the image.

19. The electronic device of claim 1, wherein applying the image mask comprises separating foreground pixels corresponding to the face from background pixels prior to manipulating the background.

20. The electronic device of claim 5, wherein the truncated depth information is generated by excluding depth points having distances greater than the determined depth of the face plus a threshold value.

* * * * *